US012434439B2

(12) United States Patent
Atwi et al.

(10) Patent No.: US 12,434,439 B2
(45) Date of Patent: *Oct. 7, 2025

(54) AUTOMATED ADDITIVE MANUFACTURING PRODUCTION SYSTEMS AND METHODS

(71) Applicant: Ford Global Technologies, LLC, Dearborn, MI (US)

(72) Inventors: Hadi Atwi, Dearborn, MI (US); Richard Moore, Fenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 320 days.

This patent is subject to a terminal disclaimer.

(21) Appl. No.: 17/502,702

(22) Filed: Oct. 15, 2021

(65) Prior Publication Data
US 2023/0077236 A1    Mar. 9, 2023

Related U.S. Application Data

(63) Continuation-in-part of application No. 17/470,824, filed on Sep. 9, 2021, now Pat. No. 12,061,475.

(51) Int. Cl.
*B29C 64/393*    (2017.01)
*B25J 5/00*    (2006.01)
(Continued)

(52) U.S. Cl.
CPC .............. *B29C 64/393* (2017.08); *B25J 11/00* (2013.01); *B29C 64/25* (2017.08); *B33Y 30/00* (2014.12);
(Continued)

(58) Field of Classification Search
CPC ..... B22F 12/88; B29C 64/379; B29C 64/393; B25J 9/1682; B25J 9/0084; G05B 19/4099; G05B 2219/343482; G05B 19/34348
See application file for complete search history.

(56) References Cited

U.S. PATENT DOCUMENTS 10,058,995 B1 *   8/2018  Sampedro ................ B25J 9/163
10,214,275 B2 *   2/2019  Goehlich .................. B64C 1/00
(Continued)

FOREIGN PATENT DOCUMENTS

EP    3851266    7/2021

OTHER PUBLICATIONS

Espacenet Sampedro (U.S. Pat. No. 10,058,995 B1) with Paragraph Numbers (Year: 2023).*
(Continued)

*Primary Examiner* — Seyed Masoud Malekzadeh
(74) *Attorney, Agent, or Firm* — Burris Law, PLLC

(57) ABSTRACT

An automated additive manufacturing production (AAMP) system includes one or more AAMP system stations disposed in an environment and configured to perform one or more AAMP routines, where each AAMP system station from among the one or more AAMP system stations includes a door. The AAMP system includes one or more robots configured to autonomously travel within the environment and a controller comprising an application program interface (API) configured to communicably couple the one or more robots and the one or more AAMP system stations, where the one or more robots are configured to command, via the API, the one or more AAMP system stations to selectively position the door and initiate the one or more AAMP routines.

19 Claims, 9 Drawing Sheets

(51) Int. Cl.
  *B25J 11/00* (2006.01)
  *B29C 64/25* (2017.01)
  *B33Y 30/00* (2015.01)
  *B33Y 50/02* (2015.01)
  *G05B 19/4099* (2006.01)
  *G05B 19/418* (2006.01)

(52) U.S. Cl.
  CPC .......... *B33Y 50/02* (2014.12); *G05B 19/4099* (2013.01); *G05B 19/4188* (2013.01); *B25J 5/007* (2013.01); *G05B 2219/34348* (2013.01); *G05B 2219/49023* (2013.01)

(56) References Cited

U.S. PATENT DOCUMENTS

| | | |
|---|---|---|
| 11,054,808 B2 | 7/2021 | Wynne et al. |
| 11,981,078 B2 * | 5/2024 | Van Esbroeck ....... B29C 64/379 |
| 2014/0367519 A1 * | 12/2014 | Goehlich ................ B22F 7/062 |
| | | 244/119 |
| 2018/0339456 A1 * | 11/2018 | Czinger ................ B29C 64/379 |
| 2020/0009791 A1 | 1/2020 | Lakhani |
| 2020/0031057 A1 * | 1/2020 | Yan ........................ B33Y 10/00 |
| 2020/0122388 A1 * | 4/2020 | Van Esbroeck ....... B29C 64/393 |
| 2022/0324177 A1 * | 10/2022 | Debora ................ B29C 64/307 |
| 2023/0311414 A1 * | 10/2023 | Van Esbroeck .... A61C 13/0004 |
| | | 264/401 |

OTHER PUBLICATIONS

Universal Robots, Voodoo Manufacturing—Triple 3D Printing Production With Collaborative Robots, pp. 1-6, printed Aug. 12, 2021.

* cited by examiner

AUTOMATED ADDITIVE MANUFACTURING PRODUCTION SYSTEMS AND METHODS

CROSS-REFERENCE TO RELATED APPLICATION

This application is a continuation-in-part of and claims the benefit of U.S. application Ser. No. 17/470,824, filed Sep. 9, 2021, and titled "AUTOMATED ADDITIVE MANUFACTURING PRODUCTION SYSTEMS AND METHODS," now issued as U.S. Pat. No. 12,061,475, the contents of which are incorporated herein by reference in its entirety.

FIELD

The present disclosure relates to systems and methods of automated additive manufacturing production systems.

BACKGROUND

The statements in this section merely provide background information related to the present disclosure and may not constitute prior art.

Additive manufacturing production systems may include controllers and robots that are configured to sequentially add layers of materials to build three-dimensional (3D) objects, such as tools, consumer electronics, plastics, vehicle components, aerospace components, among other objects. However, additive manufacturing production processes are time-consuming and require substantial operator interaction and control to ensure that the objects are timely, efficiently, and accurately produced. The present disclosure addresses these and other issues associated with additive manufacturing production systems.

SUMMARY

This section provides a general summary of the disclosure and is not a comprehensive disclosure of its full scope or all of its features.

The present disclosure provides an automated additive manufacturing production (AAMP) system comprising one or more AAMP system stations disposed in an environment and configured to perform one or more AAMP routines, where each AAMP system station from among the one or more AAMP system stations includes a door. The AAMP system includes one or more robots configured to autonomously travel within the environment and a controller comprising an application program interface (API) configured to communicably couple the one or more robots and the one or more AAMP system stations, where the one or more robots are configured to command, via the API, the one or more AAMP system stations to selectively position the door and initiate the one or more AAMP routines.

In one form, the one or more robots are configured to command, via the API, the one or more AAMP system stations to open and close the door. In one form, the one or more robots are configured to command, via the API, the one or more AAMP system stations to initiate a printing routine as the one or more AAMP routines. In one form, the one or more robots are configured to command, via the API, the one or more AAMP system stations to initiate a maintenance routine as the one or more AAMP routines. In one form, a robot from among the one or more robots is configured to command, via the API, an AAMP system station from among the one or more AAMP system stations to initiate the maintenance routine in response to the robot removing a workpiece from the AAMP system station. In one form, a robot from among the one or more robots is configured to command, via the API, an AAMP system station from among the one or more AAMP system stations to initiate the maintenance routine in response to a printing routine being completed by the AAMP system station. In one form, a robot from among the one or more robots is configured to obtain temperature data, via the API, from an AAMP system station from among the one or more AAMP system stations and command, via the API, the AAMP system station to initiate the maintenance routine in response to the temperature data satisfying a temperature condition. In one form, the one or more robots are configured to command, via the API, the one or more AAMP system stations to determine a printing supply level as the one or more AAMP routines. In one form, the one or more robots are configured to command, via the API, the one or more AAMP system stations to set a state of the one or more AAMP system stations based on the printing supply level.

The present disclosure provides an automated additive manufacturing production (AAMP) system comprising a plurality of AAMP system stations disposed in an environment and configured to perform one or more AAMP routines, where each AAMP system station from among the plurality of AAMP system stations includes a door, and where the plurality of AAMP system stations include one or more printers and one or more cleaning devices. The AAMP system includes a plurality of robots configured to autonomously travel within the environment and a controller comprising an application program interface (API) configured to communicably couple the plurality of robots and the plurality of AAMP system stations, where the plurality of are configured to command, via the API, the plurality of AAMP system stations to selectively position the door and initiate the one or more AAMP routines.

In one form, the plurality of robots are configured to command, via the API, the plurality of AAMP system stations to open and close the door. In one form, the plurality of robots are configured to command, via the API, a printer from among the one or more printers to initiate a printing routine as the one or more AAMP routines. In one form, the plurality of robots are configured to command, via the API, a printer from among the one or more printers to initiate a maintenance routine as the one or more AAMP routines. In one form, a robot from among the plurality of robots is configured to command, via the API, the printer to initiate the maintenance routine in response to the robot removing a workpiece from the AAMP system station. In one form, a robot from among the plurality of robots is configured to command, via the API, the printer to initiate the maintenance routine in response to a printing routine being completed by the AAMP system station.

In one form, a robot from among the plurality of robots is configured to obtain temperature data, via the API, from the printer, and command, via the API, the printer to initiate the maintenance routine in response to the temperature data satisfying a temperature condition. In one form, the plurality of robots are configured to command, via the API, a cleaning device from among the one or more printers to initiate a cleaning routine as the one or more AAMP routines. In one form, the plurality of robots are configured to obtain, via the API, state information of the one or more AAMP system stations. In one form, the state information includes a printer state of a printer from among the one or more printers, and in response to the printer state operating in one of a finished state and an available state, a robot from among the plurality of robots is configured to command, via the API, the printer to open the door. In one form, the state information includes a cleaning device state of a cleaning device from among the one or more cleaning devices, and in response to the cleaning device state operating in one of a finished state and an available state, a robot from among the plurality of robots is configured to command, via the API, the cleaning device to open the door.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
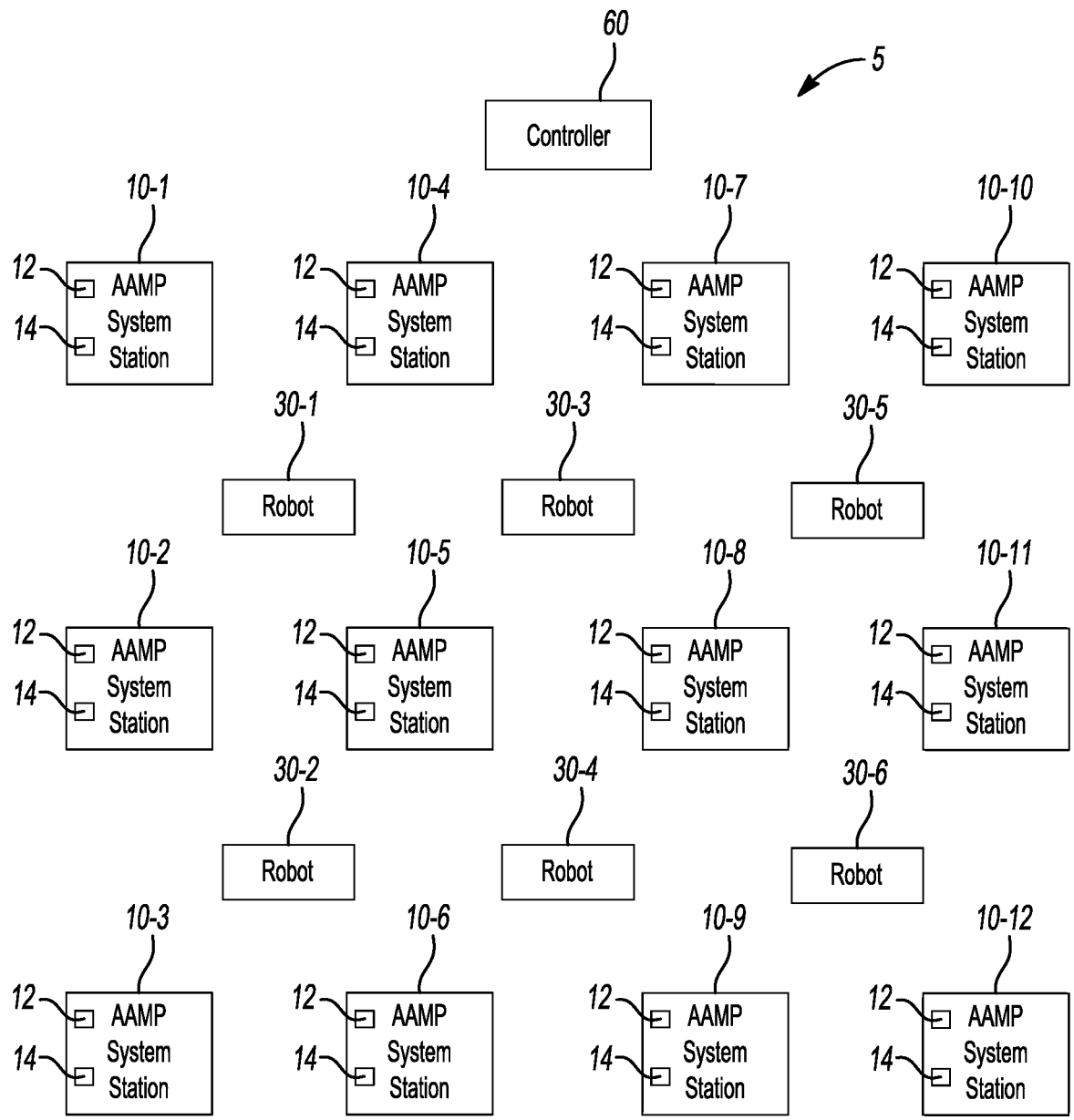
FIG. 1 is a functional block diagram of an additive manufacturing environment in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a plurality of autonomous robots that collectively initiate one or more AAMP routines performed at 3D printing devices and/or cleaning devices. Specifically, a controller obtains robot operation data and AAMP system station data to assign the robots to various 3D printing devices, cleaning devices, and/or auxiliary AAMP stations of the robot and initiate the AAMP routines (e.g., loading/removing a workpiece into a washer).

As an example, the controller may select a robot not having an auxiliary AAMP station disposed thereon to load a workpiece into a 3D printing device. Once the 3D printing operation is completed by the 3D printing device, the controller may obtain operation data from the cleaning devices and the robots having the auxiliary AAMP stations disposed thereon. Furthermore, if the operation data of the cleaning devices indicate that the cleaning devices are unavailable, the controller may assign one of the available robots having an available auxiliary AAMP station to perform the cleaning routine based on a distance between the robots having an available auxiliary AAMP station and the 3D printing device. As another example, if the robots having an available auxiliary AAMP station are unavailable to perform the cleaning routine, the controller may assign one of the cleaning devices to perform the cleaning routine and one of the available robots not having an available auxiliary AAMP station to remove the workpiece from the 3D printing device and load it into the assigned cleaning device. As an additional example, if both a robot having an auxiliary AAMP station and a cleaning device are available, the controller may selectively assign one of the devices to perform the cleaning routine such that a distance traveled by the robots and/or time elapsed between the end of the 3D printing routine and the initiation of the cleaning routine is inhibited.

As such, the controller enhances the efficiency of AAMP routines of the additive manufacturing environment by selectively and collaboratively facilitating the initiation of AAMP routines without operator intervention.

Referring to FIG. 1, an additive manufacturing (AM) environment 5 is provided and generally includes AAMP system stations 10-1, 10-2, . . . 10-12 (collectively referred to herein as "AAMP system stations 10"), robots 30-1, 30-2, . . . 30-6 (collectively referred to herein as "robots 30"), and a controller 60. While a plurality of robots 30 are shown, it should be understood that the AM environment 5 may include only one of the robots 30 in other forms (e.g., the robot 30-1). Furthermore, while the controller 60 is illustrated as part of the AM environment 5, it should be understood that the controller 60 may be positioned remotely from the AM environment 5. In one form, the AAMP system stations 10, the robots 30, and the controller 60 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others). In one form, the AAMP system stations 10 and the robots 30 are communicably coupled to each other via an application programming interface (API) that is uniquely defined based on the type of AAMP system station 10 and the type of robot 30 (e.g., an API that enables communication between a KUKA® robot and a CARBON® 3D printer/washer and/or an HP® 3D printer/washer). As an example, the API may include one or more server tags that communicably couple the robots 30 and the AAMP system stations 10 to a remote server (e.g., a JAVA® JavaServer, Python® client server, among other servers) via a transmission control protocol (TCP) socket. Additional details regarding the API are provided below with reference to FIGS. 8-9.

In one form, the AAMP system stations 10 include AAMP components 12 that are configured to perform one or more AAMP routines. As used herein, an "AAMP routine" refers to an automated pre-processing AM routine, an automated processing AM routine, and/or an automated post-processing AM routine performed by the AAMP system stations 10. Example automated pre-processing AM routines include, but are not limited to: defining and/or uploading digital models of a 3D product (e.g., a computer-aided design (CAD) file and/or a standard tessellation language (STL) file), slicing the digital model of the 3D product to define individual layers, defining tool paths for one or more tools of the AAMP system stations 10, loading filament into a spool, among others. Example automated processing AM routines include, but are not limited to: depositing, joining, or solidifying a material to create the 3D product. Example automated post-processing AM routines include, but are not limited to: cleaning, curing, surface finishing, fixing, and/or coloring the 3D product; one or more maintenance operations performed by the AAMP system station, such as cleaning a spittoon of the printer, determining a status/functionality of a printer head, among other maintenance routines; and determining a printing supply level of the AAMP system station. To perform the AAMP routines described herein, the AAMP components 12 may include a printer, a cleaning device (e.g., an air-based washer, an alcohol-based washer, a material jetting device, a powder bed fusion device, among others), a filling/welding device, an ultraviolet-curing (UV-curing) device, sensors, among other AAMP components.

In one form, the AAMP system stations 10 include an AAMP controller 14 configured to monitor and control the AAMP routines performed by the AAMP components 12. In one form, the AAMP controller 14 is configured to broadcast operation data of the AAMP system station 10 (hereinafter referred to as "AAMP system operation data") to the controller 60, and the AAMP system operation data may include a printer state, a cleaning device state, temperature data obtained from one or more temperature sensors of the AAMP system stations 10, or a combination thereof. As an example, the printer/cleaning device state may indicate that the printer/cleaning device (as the AAMP system station 10) is operating in an available state, an unavailable state, or a finished state. As used herein, the "available state" refers to not having a workpiece disposed therein for performing the AAMP routine. As used herein, the "unavailable state" refers to having a workpiece disposed therein and currently performing the AAMP routine. As used herein, the "finished state" refers to having a workpiece disposed therein and completing an AAMP routine. It should be understood that the AAMP system operation data may include other types of data, such as identification information of the AAMP system station 10, capability/constraints associated with the AAMP system station 10, or a combination thereof. As described below in further detail, the controller 60 is configured to select at least a set of the AAMP system stations 10 to perform an AAMP routine based on the AAMP system operation data and a digital model of the AM environment 5.

Figure 2:
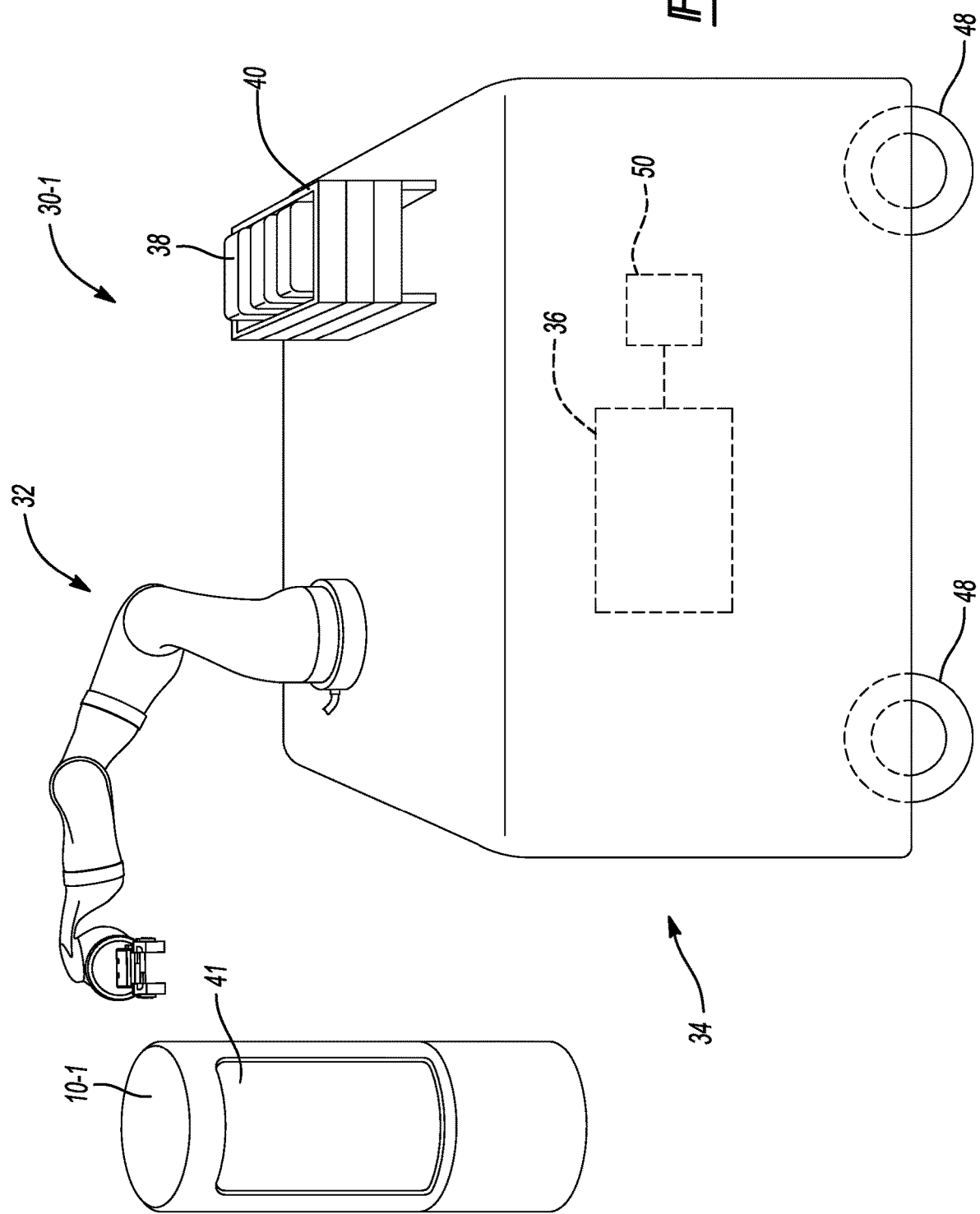
FIG. 2 is a schematic of an example robot in accordance with the present teachings of the present disclosure.

Referring to FIGS. 1-2, in one form, the robot 30-1 includes one or more robotic arms 32 disposed on a body 34 of the robot 30-1 and a robot controller 36-1. In one form, the robotic arm 32 has varying ranges of motion, and the robot controller 36-1 is configured to operate the robotic arm 32 to perform one or more automated tasks. As an example, the robot controller 36-1 may control the robotic arm 32 to remove a workpiece 38 from a tray 40 and install the workpiece 38 onto a fixture of the cleaning device or printer (as the AAMP system station 10-1). As another example, the robot controller 36-1 may control the robotic arm 32 to remove the workpiece 38 from the cleaning device or printer (as the AAMP system station 10-1) and install the workpiece 38 within the tray 40. As an additional example, the robot controller 36-1 may control the robotic arm 32 to open and/or close a door or lid (collectively referred to hereinafter as "door 41") of the printer or cleaning device (as the AAMP system station 10-1).

Figure 3:
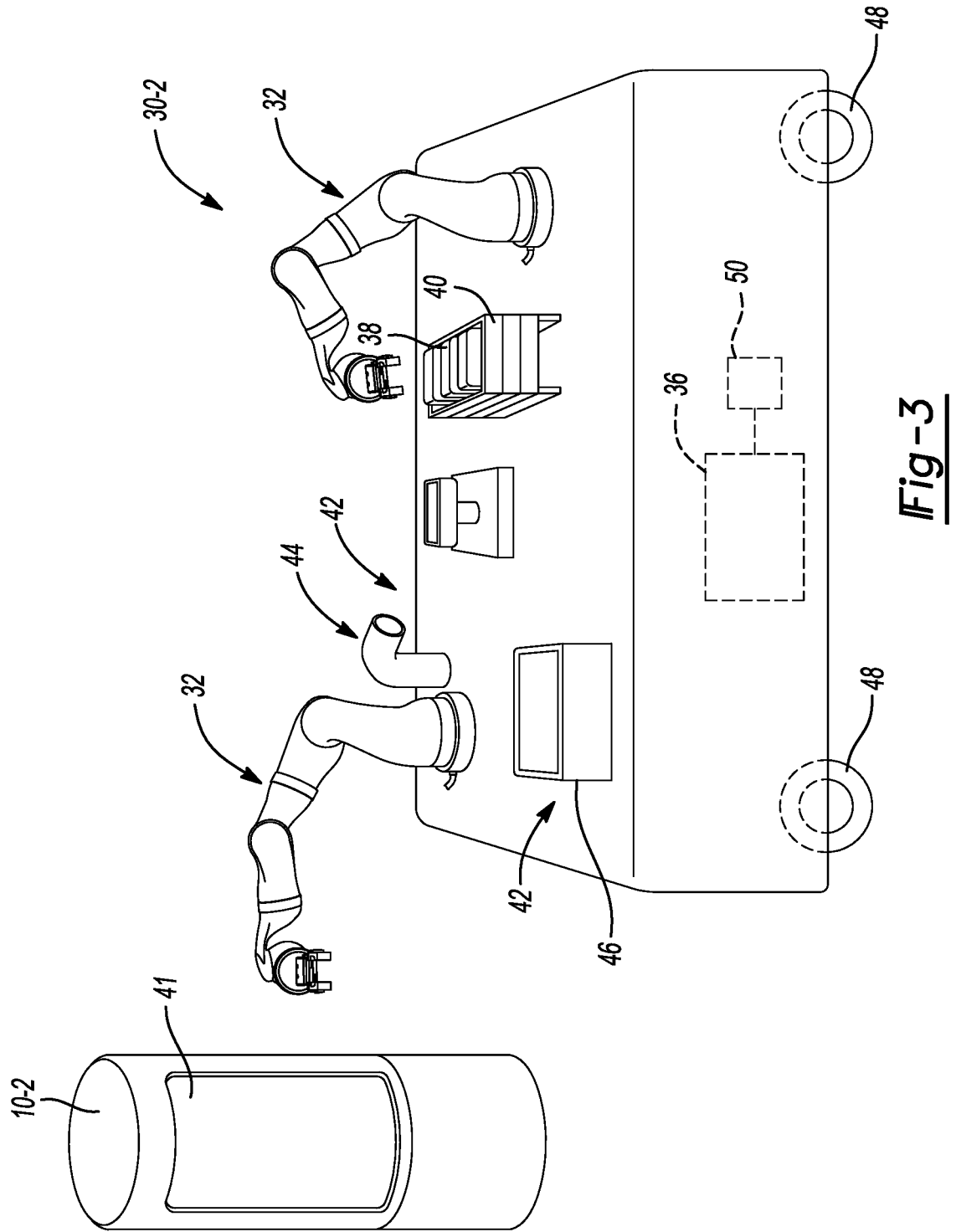
FIG. 3 is a schematic of another example robot in accordance with the present teachings of the present disclosure.

Referring to FIGS. 1 and 3, in one form, the robot 30-2 is similar to the robot 30-1 but further includes an auxiliary AAMP processing station 42 disposed on the body 34 of the robot 30-2. In one form, the auxiliary AAMP processing stations 42 include one or more components configured to perform an automated pre-processing AM routine and/or an automated post-processing AM routine. As an example, the auxiliary AAMP processing stations 42 may include a cleaning device, such as, but not limited to: an air-based washer 44 (e.g., a compressor and a conduit that collectively emit compressed air), an alcohol-based washer 46 (e.g., an isopropyl alcohol (IPA) cleaning tank), or a combination thereof. The robot 30-2 includes a robotic controller 36-2 that is similar to the robotic controller 36-1 but includes additional functionality to operate the auxiliary AMMP processing station 42. For example, the robot controller 36-2 is configured in a similar manner as the robotic controller 36-1 to control the robotic arms 32 of the robot 30-2 and further controls the robotic arms 32 to position the workpiece 38 adjacent and/or within the air-based washer 44 and/or alcohol-based washer 46 to clean the workpiece 38. In the following, the robotic controllers 36-1 and 36-2 may collectively be referred to as "robotic controller 36."

Referring to FIGS. 1-3, in one form, the robots 30 are partially or fully autonomous and are configured to autonomously move to various locations of the AM environment 5, as instructed by the controller 60. To autonomously move itself, the robot controller 36 is configured to control various movement systems of the robot 30 based on location data obtained from one or more sensors 50. In an example application, the movement systems may include propulsion systems, steering systems for controlling wheels 48, and/or brake systems, and the sensors 50 for providing location data may include a GNSS sensor, an imaging sensor, a local position sensor, among others. As such, the robot controller 36 may include movement drivers and systems, transceivers, routers, and/or input/output interface hardware to perform the functionality described herein.

Figure 4:
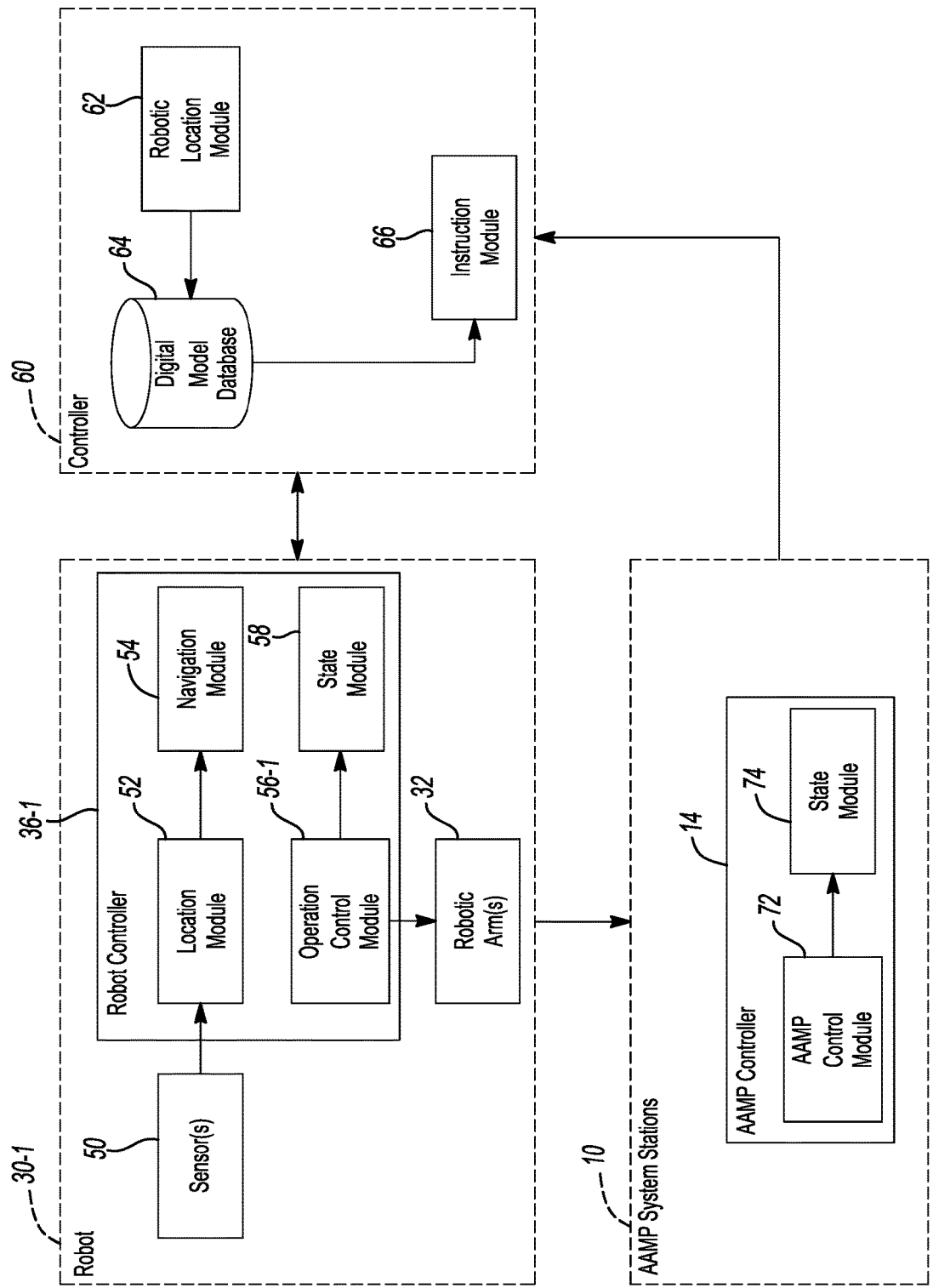
FIG. 4 is a functional block diagram of a robot, a controller, and an AAMP system station in accordance with the present teachings of the present disclosure.

Referring to FIGS. 4, the robot controller 36-1 of the robot 30-1 includes a location module 52, a navigation module 54, an operation control module 56-1, and a state module 58. In one form, the controller 60 includes a robot location module 62, a digital model database 64, and an instruction module 66. In one form, the AAMP controller 14 includes an AAMP control module 72 and a state module 74. It should be readily understood that any one of the components of the robot controller 36-1, the controller 60, and the AAMP controller 14 can be provided at the same location or distributed at different locations (e.g., via one or more edge computing devices) and communicably coupled accordingly.

In one form, the location module 52 determines the location of the robot 30-1 based on location data generated by the sensors 50, which may be a GNSS sensor. In one form, the navigation module 54 is configured to autonomously navigate within the AM environment 5 based on: an instruction from the controller 60 to autonomously travel to one of the AAMP system stations 10; the determined location of the robot 30-1; and known autonomous navigation routines (e.g., a path planning routine, a maneuver planning routine, and/or a trajectory planning routine).

In one form, the operation control module 56-1 of the robot 30-1 is configured to control the operation of the robotic arms 32 to perform the automated tasks based on the instruction from the controller 60. As an example, the operation control module 56-1 of the robot 30-1 may control the robotic arm to remove/install the workpiece 38 from/into the tray 40 or AAMP system station 10, and/or open/close the door 41 of the AAMP system station 10. In one form, the state module 58 is configured to broadcast operation data of the robot 30-1 (hereinafter referred to as "robot operation data") to the controller 60, and the robot operation data may include a type of operation being performed by the robotic arms 32, a location of the robot 30-1, and/or a navigation state of the robot 30-1 (e.g., the robot 30-1 is autonomously navigating to a given AAMP system station 10 to initiate an AAMP routine based on the instruction from the controller 60).

Figure 5:
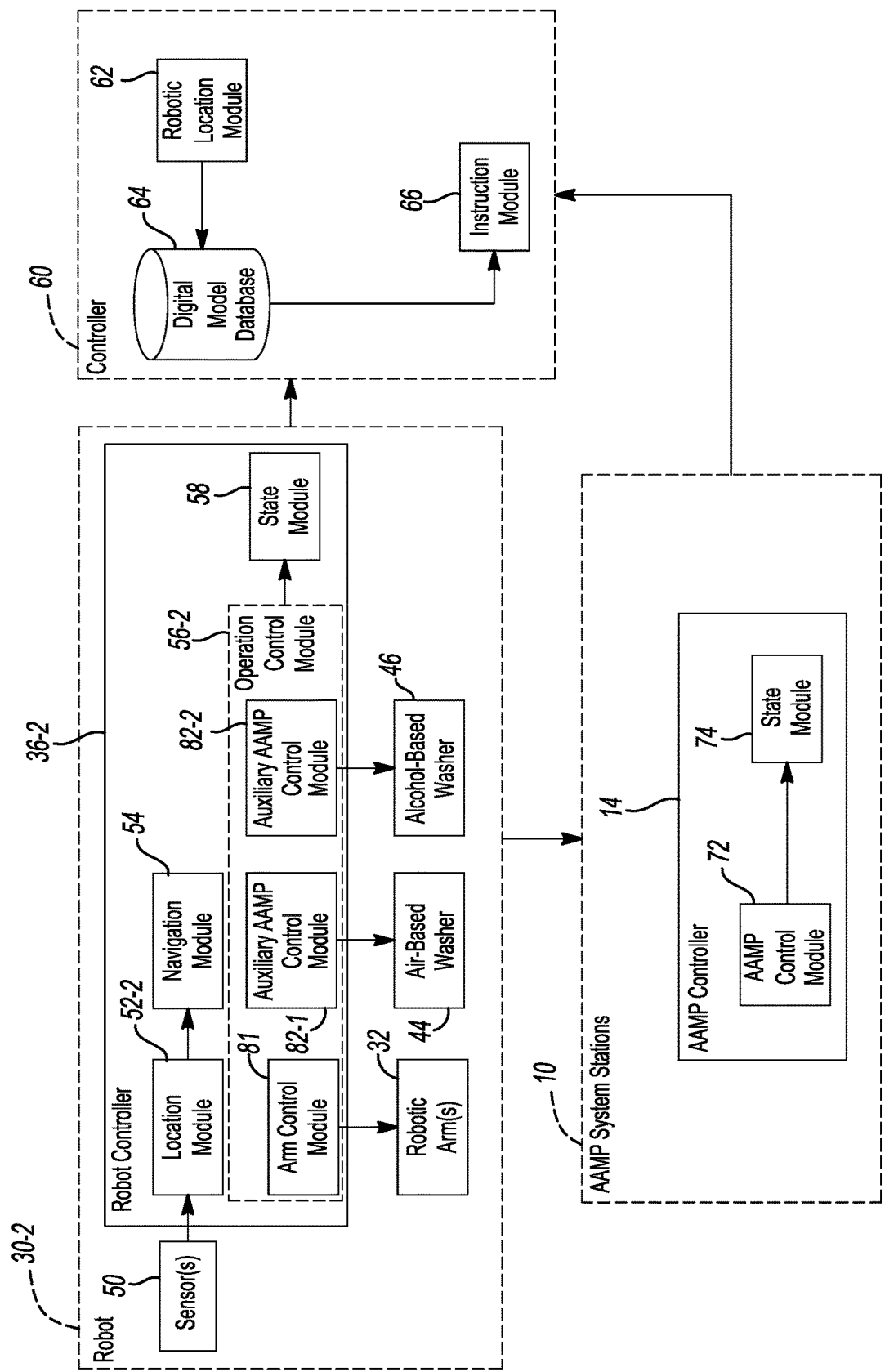
FIG. 5 is a functional block diagram of another example robot, a controller, and an AAMP system station in accordance with the present teachings of the present disclosure.

Referring to FIG. 5, the robotic controller 36-2 of the robot 30-2 is configured in a similar manner as the robotic controller 36-1 of FIG. 4, but varies with respect to the operation control module. Specifically, the robotic controller 36-2 includes an operation control module 56-2 that includes an arm control module 81 for monitoring and controlling the robotic arms 32 and auxiliary AAMP control modules 82-1, 82-2 for monitoring and controlling the air-based washer 44 and the alcohol-based washer 46. As such, the robot operation data may further include an auxiliary processing state of the robot 30-2 (e.g., are the air-based washer 44 and/or the alcohol-based washer 46 operating in an available, unavailable, or finished state).

Referring to FIGS. 4-5, regarding the AAMP controller 14, the AAMP control module 72 is configured to monitor and control the AAMP routines performed by the AAMP components 12. In one form, the state module 74 is configured to broadcast the AAMP system operation data to the controller 60, such as the printer state (e.g., is the printer in an available, unavailable, or finished state) or the cleaning device state (e.g., is the cleaning device in an available, unavailable, or finished state).

Regarding the controller 60, the robot location module 62 is configured to dynamically update a digital model of the AM environment 5 stored in the digital model database 64 based on the location broadcasted by the state modules 58 of the robots 30. In one form, the digital model is a digital twin of the AM environment 5 and includes a location of the AAMP system stations 10 and/or the location of the robots 30.

In one form, the instruction module 66 is configured to select one or more AAMP system stations 10 and/or robots 30 to perform one or more AAMP routines based on one or more control rules configured to enhance the efficiency of the AAMP routines by collaboratively coordinating AAMP routines. In particular and as described below in further detail, the instruction module 66 may select the one or more AAMP system stations 10 and/or robots 30 based on a digital model, robot operation data, and AAMP system operation data.

In one form, the instruction module 66 is configured to select one or more AAMP system stations 10 to perform one or more AAMP routines based on the AAMP system operation data. As an example, when the printer state of a 3D printer (as the AAMP system station 10-3) is operating in the available state, the instruction module 66 selects the 3D printer to perform a 3D printing routine. As another example, when the cleaning device state of a washer (as the AAMP system station 10-4) is in the available state, the instruction module 66 selects the washer to perform a cleaning routine.

In one form, the instruction module 66 is configured to select the one or more AAMP system stations 10 and to select one or more robots 30 to initiate the one or more AAMP routines based on the digital model, which includes the location of the robots 30 and a location of the AAMP system stations 10. In one form, the instruction module 66 selects a combination of the AAMP system station 10 and the robot 30 to initiate the AAMP routine based on a distance to be traveled by the robots 30. As an example, the instruction module 66 selects the robot 30-1 to initiate the AAMP routine at the 3D printer (as the AAMP system station 10-3) in response to the distance between the robot 30-1 and the 3D printer being within a predetermined threshold distance. As another example, the instruction module 66 selects the robot 30-1 to initiate the AAMP routine at the washer (as the AAMP system station 10-4) in response to the distance between the robot 30-1 and the washer being less than the distance between the robot 30-2 and the washer.

In one form, the instruction module 66 is configured to select the one or more robots 30 to initiate the one or more AAMP routines based on the robot operation data, which may include the type of operation being performed by the robotic arms 32, the navigation state of the robot 30, and auxiliary process state of the robot 30 provided that the robot includes the auxiliary AAMP processing station 42. As an example, the instruction module 66 selects the robot 30-1 to initiate the AAMP routine at the washer (as the AAMP system station 10-4) in response to the robot operation data of robot 30-1 indicating that no functions are currently being performed by the robotic arms 32 and that the robot 30-1 is not autonomously navigating to another AAMP system station 10. As another example, the instruction module 66 selects the robot 30-2 to initiate the AAMP routine at the 3D printer (as the AAMP system station 10-3) in response to the robot operation data indicating that no operations are currently being performed by the robotic arms 32, the air-based washer 44 and the alcohol-based washer 46 are in an available state, and that the robot 30-2 is not autonomously navigating to another AAMP system station 10.

In one form, the instruction module 66 is configured to generate and broadcast instructions to the selected robots 30 based on the location and the AAMP system operation data. As an example, when the printer state of a 3D printer (as the AAMP system station 10-3) is operating in the finished state, the instruction module 66 is configured to select and instruct robot 30-1 to travel to a location associated with the 3D printer to install the workpiece 38 onto a fixture of the 3D printer. Furthermore, the instruction module 66 may instruct the robot 30 to open the door 41 prior to installing the workpiece 38 onto the fixture and close the door 41 once the installation is complete.

As another example, when the printer state of a 3D printer (as the AAMP system station 10-3) is operating in the finished state, the instruction module 66 is configured to select and instruct the robot 30-1 to travel to a location associated with the 3D printer and to remove the workpiece 38 from the fixture of the 3D printer. Furthermore, the instruction module 66 may instruct the robot 30 to open the door 41 prior to removing the workpiece 38 from the fixture and close the door 41 once the removal is complete.

As an additional example, when the cleaning device state of a washer (as the AAMP system station 10-4) is operating in the available state, the instruction module 66 is configured to select and instruct the robot 30-1 to install the workpiece 38 onto a fixture of the washer. Furthermore, the instruction module 66 may instruct the robot 30 to open the door 41 prior to installing the workpiece 38 onto the fixture and close the door 41 once the installation is complete. In one form, the instruction module 66 instructs the robot 30-1 to install the workpiece 38 onto a fixture of the washer (as the AAMP system station 10-4) in response to the printer state of the 3D printer (as the AAMP system station 10-3) operating in the finished state.

As a further example, when the cleaning device state of the washer (as the AAMP system station 10-4) is operating in the finished state, the instruction module 66 is configured to select and instruct the robot 30-1 to remove the workpiece 38 from the fixture of the washer. Furthermore, the instruction module 66 may instruct the robot 30 to open the door 41 prior to removing the workpiece 38 from the fixture and close the door 41 once the removal is complete.

As an additional example, when the printer state of a 3D printer (as the AAMP system station 10-3) is operating in the finished state and the auxiliary processing state of the robot 30-1 is in the available state, the instruction module 66 is configured to select and instruct the robot 30-2 to travel to a location associated with the 3D printer, open the door 41, remove the workpiece 38 from the fixture of the 3D printer, close the door 41, and position the workpiece 38 within and/or adjacent to the auxiliary AAMP processing station 42 to perform the auxiliary AAMP processing routine.

Accordingly, the instruction module 66 is configured to enhance the efficiency of AAMP routines of the AM environment 5 by selectively and collaboratively facilitating and initiating sequences of AAMP routines using autonomous robots and without operator intervention. Furthermore, the instruction module 66 enhances the efficiency of AAMP routines of the AM environment 5 by accounting for dedicated autonomous robots that perform AAMP routines when selectively and collaboratively facilitating and initiating sequences of the AAMP routines.

Figure 6:
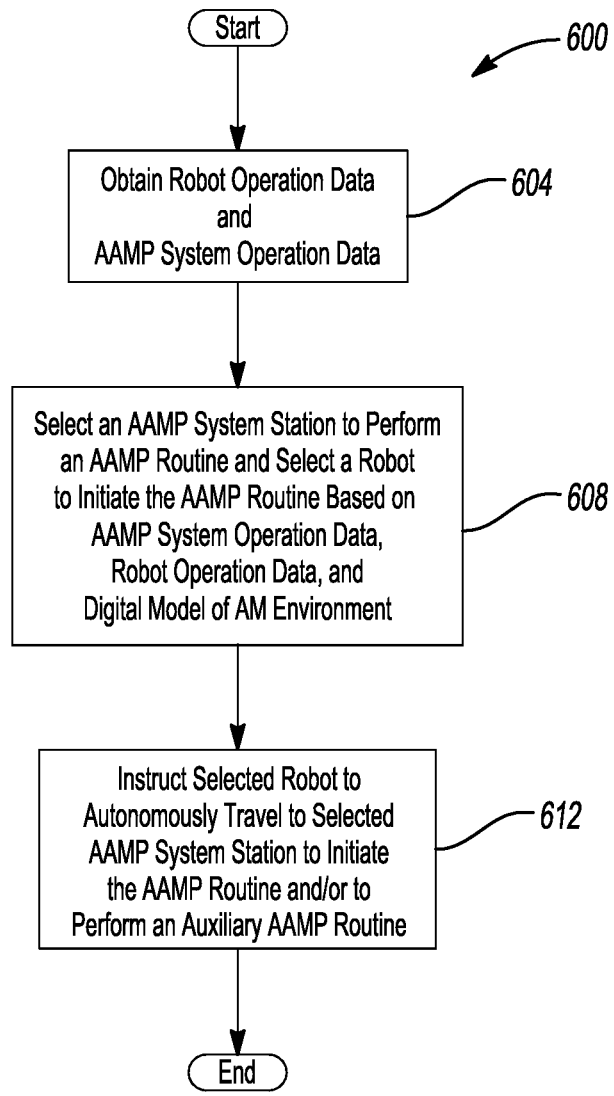
FIG. 6 illustrates an example control routine in accordance with the teachings of the present disclosure.

Referring to FIG. 6, an example routine 600 for controlling one or more AAMP routines performed by the AAMP system stations 10 is provided. At 604, the controller 60 obtains robot operation data and AAMP system operation data. At 608, the controller 60 selects one or more of the AAMP system stations 10 to perform a given AAMP routine and selects one of the robots 30 to initiate the AAMP routine based on the AAMP system data, the robot operation data, and the digital model of the AM environment 5. At 612, the controller 60 instructs the selected robot 30 to autonomously travel to the selected AAMP system stations 10 to initiate the AAMP routine and/or to perform the auxiliary AAMP routine.

Figure 7:
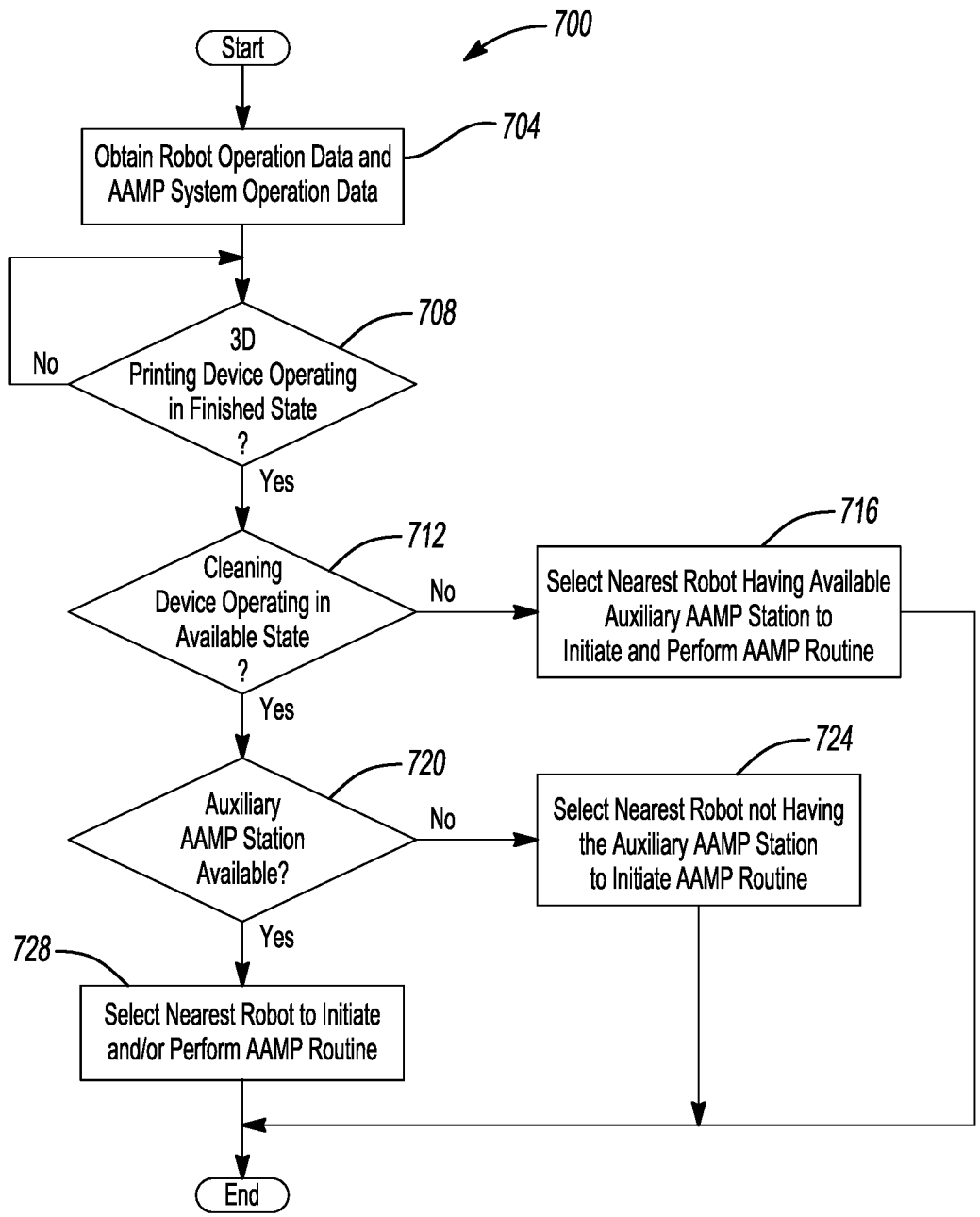
FIG. 7 illustrates another example control routine in accordance with the teachings of the present disclosure.

Referring to FIG. 7, an example routine 700 for selecting the robot 30 to initiate the AAMP routine (e.g., step 608 of FIG. 6) is provided. At 704, the controller 60 obtains robot operation data and AAMP system operation data. At 708, the controller 60 determines whether a 3D printing device from among the AAMP system stations 10 is operating in a finished state. If so, the routine 700 proceeds to 712. If none of the 3D printing devices from among the AAMP system stations 10 is operating in the finished state, the routine 700 remains at 708 until one of the 3D printing devices is operating in the finished state.

At 712, the controller 60 determines whether one of the cleaning devices from among the AAMP system stations 10 is operating in an available state. If so, the routine 700 proceeds to 720. Otherwise, the routine 700 proceeds to 716, where the controller 60 selects the nearest robot 30 having an auxiliary AAMP processing station 42 (e.g., the robot 30-2) operating in an available state to initiate and perform the AAMP routine and proceeds to 732. At 720, the controller 60 determines whether one of the auxiliary AAMP processing stations 42 of the robots 30 is operating in an available state. If so, the routine 700 proceeds to 728. Otherwise, the routine 700 proceeds to 724, where the controller 60 selects the nearest robot 30 not having an auxiliary AAMP processing station 42 (e.g., the robot 30-1) to initiate the AAMP routine and proceeds to 732. At 728, the controller 60 selects the nearest robot from among the plurality of robots 30 to initiate and/or perform the AAMP routine.

Figure 8:
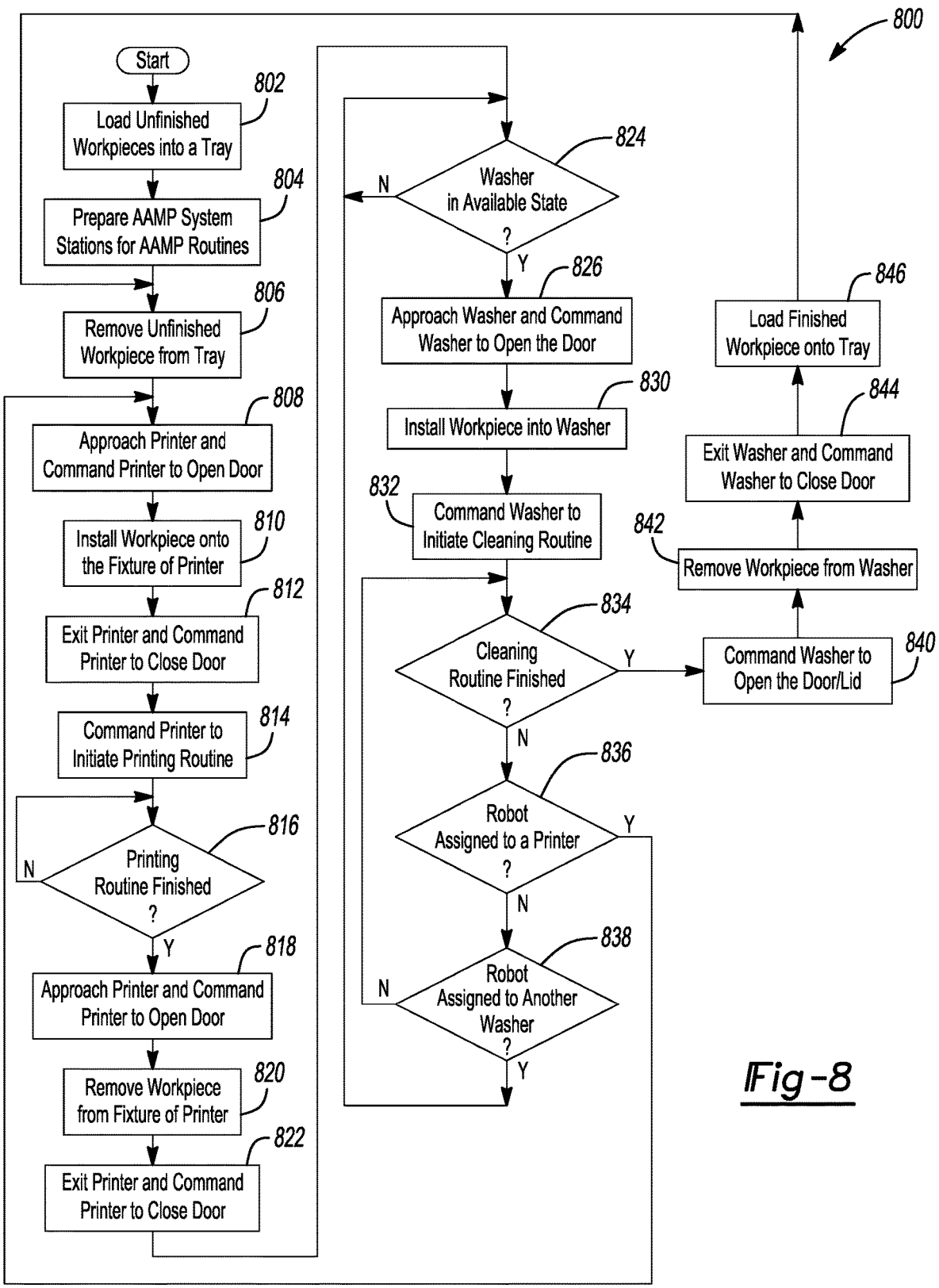
FIG. 8 is a flowchart representing an application programming interface associated with a robot and an AAMP system station in accordance with the present teachings of the present disclosure.

Referring to FIG. 8, an example routine 800 for selectively positioning the door 41 of the AAMP system stations 10 and initiating one or more AAMP processing routines using the robots 30 is shown. As described above, the robots 30 and the AAMP system stations 10 are communicably coupled via an API that includes one or more server tags configured to communicably couple the robots 30 and the AAMP system stations 10 to a remote server (e.g., a JAVA® JavaServer, Python® client server, among other servers) via a TCP socket. In one form, the API associated with routine 800 may be an API that enables communication between a KUKA® robot and CARBON® 3D printers/washers.

At 802, an operator and/or the robot 30 loads unfinished workpieces 38 into the tray 40 and prepares the AAMP system stations 10 for the AAMP processing routines at 804 (e.g., the operator and/or the robot 30 turns on and/or calibrates the AAMP system stations 10), and at 806, the robot 30 removes an unfinished workpiece 38 from the tray 40. At 808, the robot 30 approaches a printer (as the AAMP system station 10-1) and commands, via the API, the printer to open the door 41. At 810, the robot 30 installs the workpiece 38 onto the fixture of the printer, and the robot 30 exits the printer and commands the printer, via the API, to close the door 41 at 812. At 814, the robot 30 commands, via the API, the printer to initiate a printing routine (as the AAMP routine). At 816, the robot 30 obtains, via the API, the printer state of the printer and determines whether the printing routine is finished (i.e., the robot 30 determines whether the printer state indicating the printer is operating in the finished state). In response to the printer state indicating the printer is operating in the finished state, the routine 800 proceeds to 818, where one of the robots 30 approaches the printer and commands, via the API, the printer to open the door 41. If the printer is not operating in the finished state, the routine 800 remains at 816.

At 820, the robot 30 removes the workpiece 38 from the fixture of the printer, and at 822, the robot 30 exits the printer and commands, via the API, the printer to close the door 41. At 824, the robot 30 obtains, via the API, the washer state of a washer (as the AAMP system station 10-2) and determines whether the washer state indicates the washer is operating in the available state. In response to the washer state indicating the washer is operating in the available state, the routine 800 proceeds to 826, where one of the robots 30 approaches the washer and commands, via the API, the printer to open the door 41. If the washer is not operating in the available state, the routine 800 remains at 824.

At 830, the robot 30 installs the workpiece 38 onto the fixture of the washer, and the robot 30 exits the washer and commands the washer, via the API, to close the door 41 and initiate a cleaning routine (as the AAMP routine) at 832. At 834, the robot 30 obtains, via the API, the washer state of a washer (as the AAMP system station 10-2) and determines whether the washer state indicates the washer is operating in the finished state. In response to the washer is operating in the finished state, the routine 800 proceeds to 840. If the washer is not operating in the finished state, the routine 800 proceeds to 836, where the controller 60 determines whether the robot 30 that commanded the washer to initiate the cleaning routine is assigned to one of the printers from among the plurality of AAMP system stations 10 (e.g., the controller 60 performs the routine 600 describe above with reference to FIG. 6 to determine whether the robot 30 was selected to initiate an AAMP processing routine at one of the printers). If so, the routine 800 proceeds to 808; otherwise, the routine 800 proceeds to 838.

At 838, the controller 60 determines whether the robot 30 that commanded the washer to initiate the cleaning routine is assigned to another washer from among the plurality of AAMP system stations 10 (e.g., the controller 60 performs the routine 600 describe above with reference to FIG. 6 to determine whether the robot 30 was selected to initiate an AAMP processing routine at another washer). If so, the routine 800 proceeds to 824; otherwise, the routine 800 proceeds to 834. At 840, the robot 30 approaches the washer and commands, via the API, the printer to open the door 41. At 842, the robot 30 removes the workpiece 38 from the washer, and at 844, the robot 30 exits the washer and commands, via the API, the washer to close the door 41. At 846, the robot 30 loads the finished workpiece onto the tray 40 and then proceeds to 806.

Figure 9:
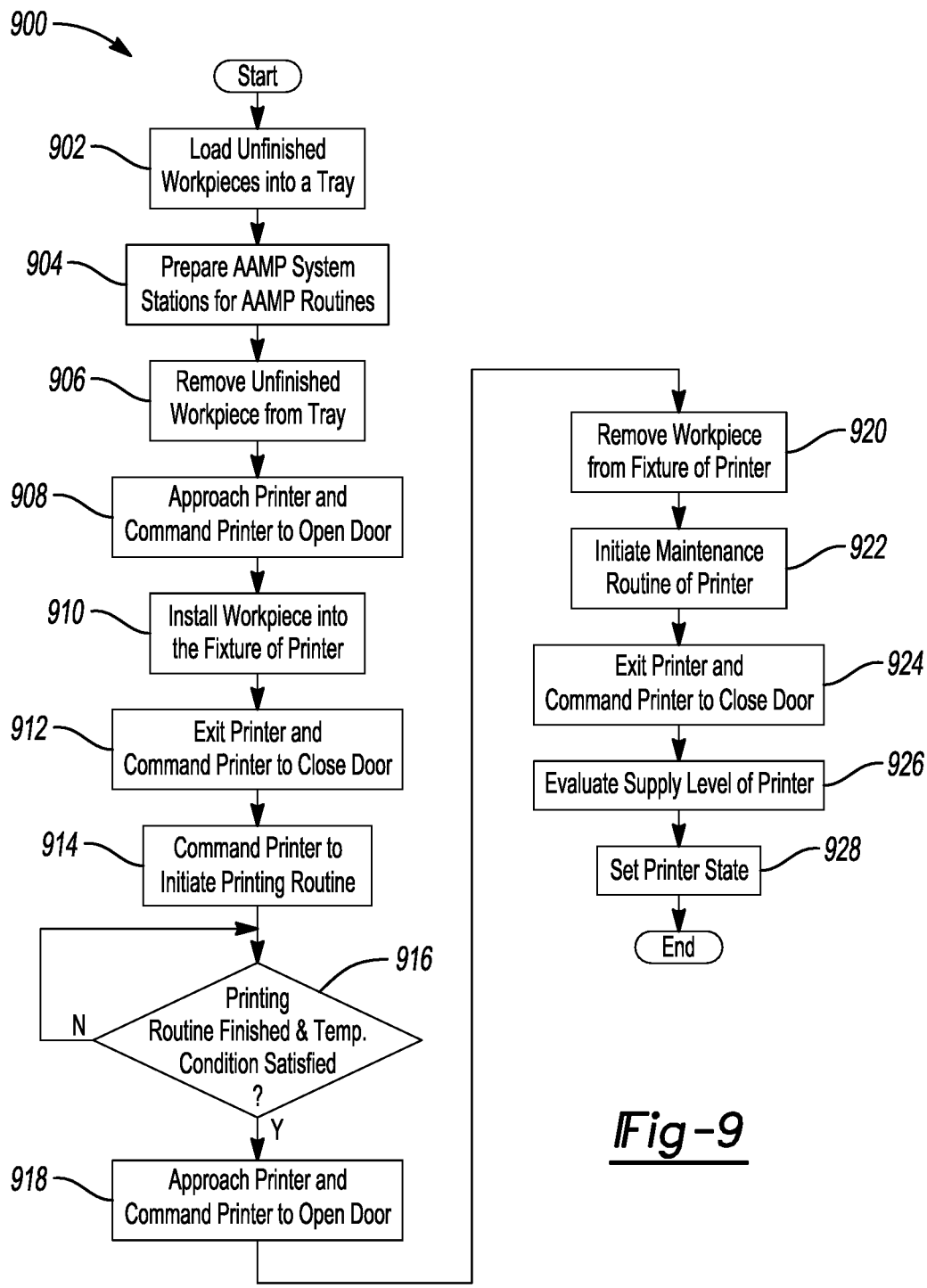
FIG. 9 is a flowchart representing another application programming interface associated with a robot and an AAMP system station in accordance with the present teachings of the present disclosure.

Referring to FIG. 9, an example routine 900 for selectively positioning the door 41 of the AAMP system stations 10 and initiating one or more AAMP processing routines using the robots 30 is shown. In one form, the API associated with routine 900 may be an API that enables communication between a KUKA® robot and an HP® 3D printer. At 902, an operator and/or the robot 30 loads unfinished workpieces 38 into the tray 40 and prepares the AAMP system stations 10 for the AAMP processing routines at 904 (e.g., the operator and/or the robot 30 turns on and/or calibrates the AAMP system stations 10), and at 906, the robot 30 removes an unfinished workpiece 38 from the tray 40. At 908, the robot 30 approaches a printer (as the AAMP system station 10-1) and commands, via the API, the printer to open the door 41. At 910, the robot 30 installs the workpiece 38 onto the fixture of the printer, and the robot 30 exits the printer and commands the printer, via the API, to close the door 41 at 912. At 914, the robot 30 commands, via the API, the printer to initiate a printing routine (as the AAMP routine).

At 916, the robot 30 obtains, via the API, the printer state of the printer and temperature data of the printer and determines whether the printing routine is finished (i.e., the robot 30 determines whether the printer state indicating the printer is operating in the finished state) and whether the temperature data satisfies a temperature condition. In one form, the temperature data satisfies the temperature condition when to a measured or predicted temperature of one or more components of the printer is less than a threshold temperature (i.e., the components of the printer are sufficiently cooled). In response to the printer state indicating the printer is operating in the finished state and the temperature condition being satisfied, the routine 900 proceeds to 918, where one of the robots 30 approaches the printer and commands, via the API, the printer to open the door 41. If the printer is not operating in the finished state or the temperature data does not satisfy the temperature condition, the routine 900 remains at 916.

At 920, the robot 30 removes the workpiece 38 from the fixture of the printer and commands, via the API, the printer to initiate a maintenance routine at 922 (as the AAMP routine). The maintenance routine may include, but is not limited to, cleaning a spittoon of the printer, determining a status/functionality of a printer head, among other maintenance routines. At 924, the robot 30 exits the printer and commands, via the API, the printer to close the door 41. At 926, the robot 30 commands, via the API, the printer to determine a printing supply level (as the AAMP routine). At 928, the robot commands, via the API, the printer to set the printer state based on the printing supply level. As an example, if the printing supply level is greater than a threshold value, the robot 30 commands, via the API, the printer to set the printer state to the available state. As another example, if the printing supply level is less than a threshold value, the robot 30 commands, via the API, the printer to set the printer state to the unavailable state and to broadcast a notification to the controller 60 indicating that the printing supply level of the printer needs to be replenished.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An automated additive manufacturing production (AAMP) system comprising:
one or more AAMP system stations disposed in an environment and configured to perform one or more AAMP routines, wherein each AAMP system station from among the one or more AAMP system stations includes a door;
a plurality of robots configured to autonomously travel within the environment; and
a controller comprising an application program interface (API) configured to:
select one or more robots from among the plurality of robots to initiate the one or more AAMP routines based on a digital model of the environment, wherein the digital model indicates respective distances between the plurality of robots and the one or more AAMP system stations, and wherein one or more first distances between the selected one or more robots and the one or more AAMP system stations are less than at least one of (i) a threshold distance and (ii) a second distance between a second robot of the plurality of robots and the one or more AAMP system stations; and
communicably couple the selected one or more robots and the one or more AAMP system stations, wherein:
the selected one or more robots are configured to command, via the API, the one or more AAMP system stations to selectively position the door and initiate the one or more AAMP routines based on the digital model of the environment and system operation data, wherein the system operation data respectively corresponds to each AAMP system station from among the one or more AAMP system stations.

2. The AAMP system of claim 1, wherein the selected one or more robots are configured to command, via the API, the one or more AAMP system stations to open and close the door.

3. The AAMP system of claim 1, wherein the selected one or more robots are configured to command, via the API, the one or more AAMP system stations to initiate a printing routine as the one or more AAMP routines.

4. The AAMP system of claim 1, wherein the selected one or more robots are configured to command, via the API, the one or more AAMP system stations to initiate a maintenance routine as the one or more AAMP routines.

5. The AAMP system of claim 4, wherein a robot from among the selected one or more robots is configured to command, via the API, an AAMP system station from among the one or more AAMP system stations to initiate the maintenance routine in response to the robot removing a workpiece from the AAMP system station.

6. The AAMP system of claim 4, wherein a robot from among the selected one or more robots is configured to command, via the API, an AAMP system station from among the one or more AAMP system stations to initiate the maintenance routine in response to a printing routine being completed by the AAMP system station.

7. The AAMP system of claim 4, wherein a robot from among the selected one or more robots is configured to:
obtain temperature data, via the API, from an AAMP system station from among the one or more AAMP system stations; and
command, via the API, the AAMP system station to initiate the maintenance routine in response to the temperature data satisfying a temperature condition.

8. The AAMP system of claim 1, wherein the selected one or more robots are configured to command, via the API, the one or more AAMP system stations to determine a printing supply level as the one or more AAMP routines.

9. The AAMP system of claim 8, wherein the selected one or more robots are configured to command, via the API, the one or more AAMP system stations to set a state of the one or more AAMP system stations based on the printing supply level.

10. The system of claim 1,
wherein the one or more AAMP system stations include one or more printers and one or more cleaning devices.

11. The AAMP system of claim 1, wherein the selected one or more robots are configured to command, via the API, a printer from among one or more printers to initiate a printing routine as the one or more AAMP routines, and wherein the one or more AAMP system stations include the one or more printers.

12. The AAMP system of claim 1, wherein the selected one or more robots are configured to command, via the API, a printer from among one or more printers to initiate a maintenance routine as the one or more AAMP routines, and wherein the one or more AAMP system stations include the one or more printers.

13. The AAMP system of claim 12, wherein a robot from among the selected one or more robots is configured to command, via the API, the printer to initiate the maintenance routine in response to the robot removing a workpiece from the one or more AAMP system station.

14. The AAMP system of claim 12, wherein a robot from among the selected one or more robots is configured to command, via the API, the printer to initiate the maintenance routine in response to a printing routine being completed by the one or more AAMP system station.

15. The AAMP system of claim 12, wherein a robot from among the selected one or more robots is configured to:
obtain temperature data, via the API, from the printer; and
command, via the API, the printer to initiate the maintenance routine in response to the temperature data satisfying a temperature condition.

16. The AAMP system of claim 1, wherein the selected one or more robots are configured to command, via the API, a cleaning device from among one or more cleaning devices to initiate a cleaning routine as the one or more AAMP routines, and wherein the one or more AAMP system stations include the one or more cleaning devices.

17. The AAMP system of claim 1, wherein the selected one or more robots are configured to obtain, via the API, state information of the one or more AAMP system stations, wherein the state information includes a printer state of a printer from among one or more printers, and in response to the printer state operating in one of a finished state and an available state, a robot from among the plurality of robots is configured to command, via the API, the printer to open the door, and wherein the one or more AAMP system stations include the one or more printers.

18. The AAMP system of claim 1, wherein the system operation data includes identification information, a capability, one or more constraints, or a combination thereof.

19. The AAMP system of claim 1, wherein state information of the one or more AAMP system stations includes a cleaning device state of a cleaning device from among one or more cleaning devices, and in response to the cleaning device state operating in one of a finished state and an available state, a robot from among the plurality of robots is configured to command, via the API, the cleaning device to open the door, and wherein the one or more AAMP system stations include the one or more cleaning devices.

* * * * *